Jan. 21, 1958 M. HUGHES 2,820,490
FROZEN CONFECTION MOLD FILLER
Filed Dec. 28, 1955 2 Sheets-Sheet 1
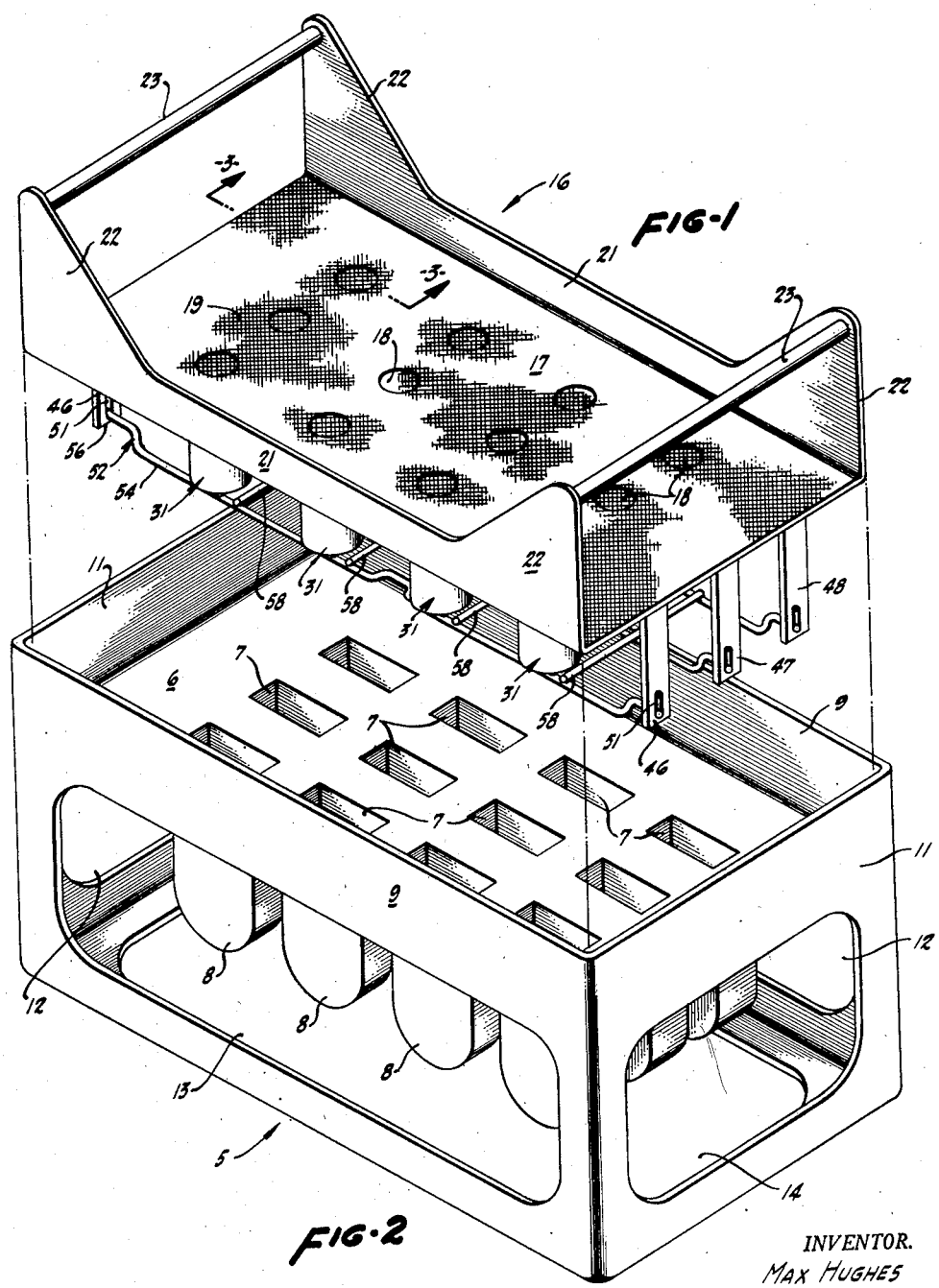
INVENTOR.
MAX HUGHES
BY Lothrop & West
ATTORNEYS Jan. 21, 1958 M. HUGHES 2,820,490
FROZEN CONFECTION MOLD FILLER
Filed Dec. 28, 1955 2 Sheets-Sheet 2
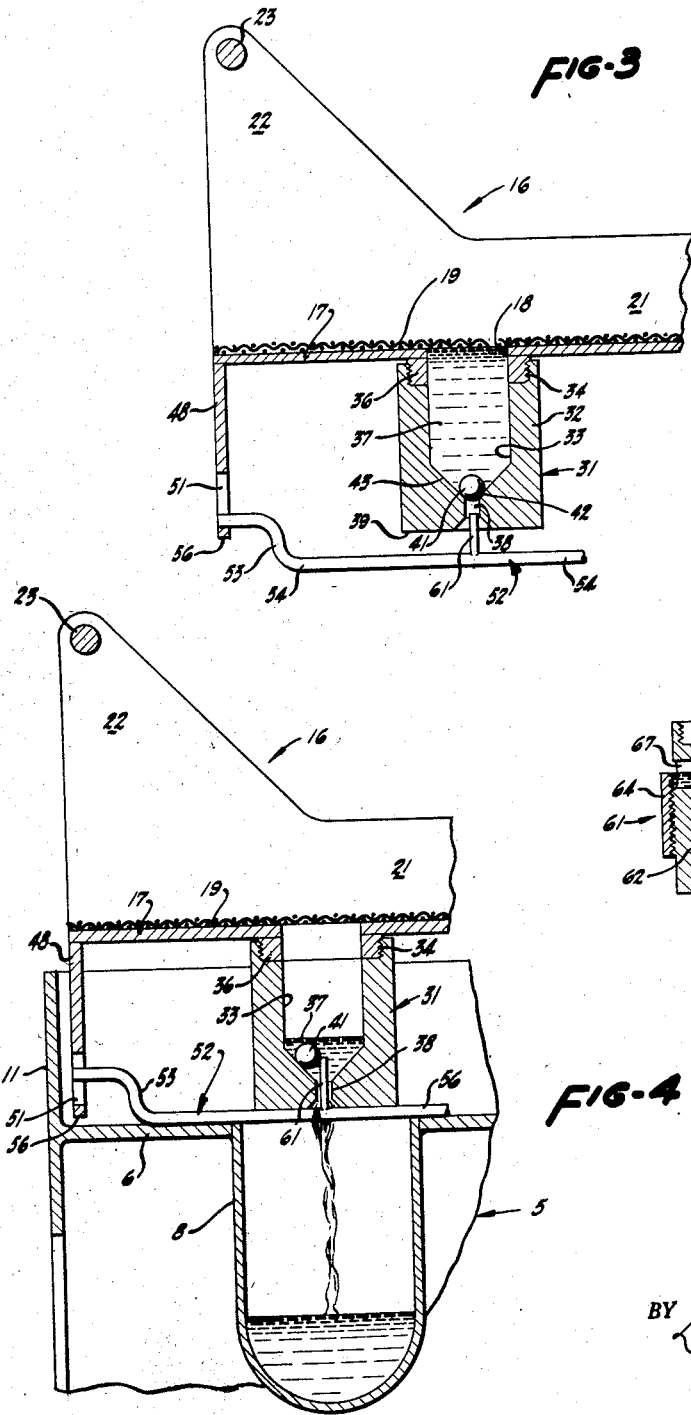
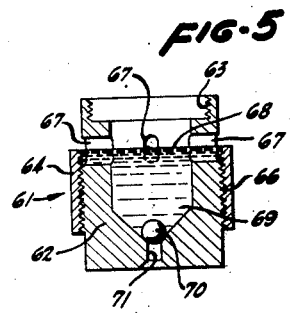
INVENTOR.
MAX HUGHES
BY Lothrop + West
ATTORNEYS United States Patent Office 2,820,490
Patented Jan. 21, 1958

2,820,490

FROZEN CONFECTION MOLD FILLER

Max Hughes, West Sacramento, Calif.

Application December 28, 1955, Serial No. 555,936

3 Claims. (Cl. 141—238)

The invention relates to fluid dispensers and, more particularly, to dispensers delivering predetermined charges of liquid to frozen confection mold compartments.

In the frozen confection industry one of the more popular products is a water ice or frozen confection comprising a variety of strata or layers of differently colored and flavored frozen liquids. Customarily, the vari-colored and vari-flavored water ices are produced by first placing a predetermined quantity or charge of watery fluid of a particular flavor and color into the bottom of a frozen confection mold and freezing or partially freezing such charge. Subsequently, an additional charge of a differently flavored and colored fluid is introduced into the mold on top of the previously frozen charge and is in turn subjected to freezing. One or more different additional flavored and colored liquids may similarly be introduced into the mold and frozen in a similar fashion. After freezing of the product, defrosting of the mold takes place and the completed item is removed and packaged for sale.

While the machinery customarily used to perform the dispensing or charging operation is a large and complicated type of apparatus with batteries of spigots having interlocks and automatic timing devices, such machines are not adaptable, owing to their price, for use in smaller frozen confection plants.

It is therefore an object of the invention to provide a frozen confection mold filler which is relatively cheap to manufacture and which, therefore, is within the economic range of even a small plant.

It is another object of the invention to provide a frozen confection mold filler which is especially adaptable for use in hand filling.

It is a further object of the invention to provide a frozen confection mold filler which has but relatively few parts and which therefore is durable and not apt to get out of order.

It is a yet further object of the invention to provide a frozen confection mold filler which can be very easily cleaned and which therefore lends itself to a high degree of sanitary maintenance.

It is yet another object of the invention to provide a mold filler which strains out foreign matter such as gelatinous globules which are undesirable in the charge, and prevents the entry of such matter into the mold.

It is a still further object of the invention to provide a mold filler which, although it is actuated by hand, provides a relatively high yield of frozen ice products.

It is yet another object of the invention to provide a mold filler having interchangeable filling compartments to adapt the device for use with different sizes of products and kinds of molds.

It is yet another object of the invention to provide a mold filler whose contents can be quickly and accurately adjusted to deliver a wide variety of predetermined charges.

It is yet another object of the invention to provide a mold filler which is positive in operation.

It is another object of the invention to provide a generally improved frozen confection mold filler.

Other objects, together with the foregoing, are attained in the embodiment described in the accompanying description and illustrated in the accompanying drawings, in which Figure 1 is a perspective of the mold filler of my invention.

Figure 2 is a perspective of one form of conventional frozen confection mold.

Figure 3 is a sectional view of a portion of the mold filler, the plane of section being taken along the plane indicated by the line 3—3 of Figure 1.

Figure 4 is a sectional view of the structure illustrated in Figure 3 but showing the parts in contacting and actuating juxtaposition with a subjacent frozen confection mold of conventional make.

Figure 5 is a sectional view of a modified form of the filling barrel.

While the frozen confection mold filler of my invention is susceptible of numerous physical embodiments depending upon the particular environment and use to which it is to be put, a considerable number of the herein shown and described devices have been made and used and have performed in an eminently satisfactory manner.

A conventional frozen confection mold 5 is illustrated in Figure 2, the mold comprising a horizontal panel 6, or tray, having a plurality of openings 7 therein surmounting a plurality of mold forms 8 mounted on and depending from the bottom surface of the horizontal panel 6. A pair of side walls 9 and end walls 11 bound the tray 6 and, in order to permit rapid access of brine or other coolant to the mold form 8 when the mold is immersed, a pair of end openings 12 and side openings 13, as well as a bottom opening 14, are provided.

While the mold filler of my invention is easily adaptable for use in completely charging or entirely filling a mold in one charge, its major utility resides in its ability to charge only a predetermined fraction of the mold form at any particular time. So also, where competitive practices require that the mold be short filled or charged in a single filling to only a major fraction of the entire mold capacity rather than to be filled to full capacity or to the top of the mold, the dispenser of my invention is of especial utility.

The mold filler is generally designated 16 and comprises a horizontal tray 17, or panel, having formed therein a plurality of openings 18 adapted to register with the underlying openings 7 in the mold. A mesh 19, or screen, is detachably mounted on the upper surface of the tray 17 and covers the molds. The screen serves, among other purposes, to separate out any foreign particles or matter such as gelatinous globules which sometimes accumulate in the water ice solution and which are undesirable in the finished product. Mounted on the side edges of the tray 17 is a pair of upstanding side walls 21 having upstanding projections 22 adjacent each end, the upstanding projections 22 being spanned by a pair of suitable handles 23 to permit the operator to grasp the filler tray 16 and to immerse the tray first in a bath of the water ice solution and to withdraw the tray therefrom prior to placement on the frozen confection mold 5.

As the filler tray 16 is immersed in the bath of fluid water ice solution, the solution runs downwardly through the screen 19, through the openings 18 in the tray 17 and into a plurality of underlying hollow barrels 31 dependingly mounted on the lower surface of the tray, each barrel having circular walls 32 defining an interior compartment 33 of predetermined volume. A satisfactory method of detachably mounting the barrels 31 on the tray is given by countersinking the barrel to form an enlarged bore section 34 threaded for engagement with a conformingly threaded bushing 36 permanently mounted on the bottom surface of the tray.

Owing to the foregoing construction, the operator is enabled to use a considerable variety of sizes of barrels, each variety having predetermined volumes of interior compartments 33. By unscrewing the barrel of one size and threading a different size barrel on the bushing, the barrels may be quickly changed to meet the requirements of the situation.

As the tray is removed from immersion in the solution bath, the interior compartments 33 of each of the barrels is filled with a predetermined quantity of fluid 37 measured by the volume of the compartment. By tilting or tipping the tray slightly any excess fluid is allowed to run off the tray surface 17 and back into the bath. The fluid 37 trapped within the barrel compartments 33, however, remains in the barrel and is prevented from draining downwardly through a central aperture 38, at the bottom end 39 of the barrel, owing to the provision of a ball 41 adapted to seat against a tapered seat 42 formed by an inclined or conical surface 43 adjacent the bottom of the interior compartment 33. The taper of the inclined surface 43 assumes a tangency with the ball and thus forms a substantially tight seal preventing any escape of the overlying fluid 37 so long as the ball remains in its seated position.

Placement of the filler 16 in registering and contacting juxtaposition not only serves to locate the filling apertures 38 directly above the corresponding molds 8 but also opens the filling barrels by lifting the balls 41 from their seats 42. As appears most clearly in Figure 1, a pair of downwardly projecting lugs 46 is mounted on each end of the tray 17 in alignment with the near row of barrels. A second pair of lugs 47 is in alignment with the center row of barrels and, in comparable fashion, a third pair of lugs 48 is aligned with the far row of barrels. In each of the pairs of lugs, for example lug pair 46, there is formed a vertical slot 51 serving to guide, in vertical movement, a wire stringer 52 downturned as at 53 so that throughout its central portion 54 it is at an elevation below the bottom end 56 of the lug 46. Consequently, as the filler is placed onto the mold, the bottoms of the wire stringers are brought into abutment with the mold tray 6 and are pushed upwardly, the ends of the wire stringers translating upwardly in the slots 51. Concurrently, a plurality of pins 61 mounted vertically on the stringers coaxially with the center line of the various barrel apertures 38 are urged upwardly and into ball unseating engagement with the ball valves 41. As the balls are unseated, as shown most clearly in Figure 4, the charge of fluid 37 in the barrel compartment 33 drains downwardly through the aperture 38 and into the subjacent mold form compartment 8.

Substantially simultaneous charging of each of the various molds 8 thereby takes place. As soon as the charging has been completed the filler is withdrawn and the partially charged mold is advanced to its mold freezing station. Upon vertical withdrawal of the filler tray 16 gravity effects a vertically downward translation of the stringers and a reseating of the ball valves preparatory to the next immersion in the liquid solution reservoir, it being clear that as the barrel is again filled the weight of the fluid above the ball causes an even tighter seating of the ball to take place, thus preventing premature escape of the fluid.

It is especially to be noted that the screen 19 not only serves to filter out undesirable foreign matter but it also effectively holds the balls in the barrels even though the filler is turned upside down. However, the screen is detachably removable in any appropriate way from the tray, to allow easy cleaning of the screen, and the wire stringers can also be quickly removed for sterilization as, for example, by making the supporting lugs of a somewhat resilient material to permit their being temporarily sprung outwardly adjacent their lower ends to permit withdrawal and reinsertion of the stringers. It is often found useful to cross-connect the stringers by suitable cross-cleats 58, the wires then forming a fairly rigid grid which stiffens the wires and causes the entire structure to translate in unison even though the operator places the filler on the mold with some misalignment.

Figure 5 illustrates a modified form of the barrel shown in Figure 3 and is especially useful for quickly adjusting the fluid charge to be dispensed. The modified form of barrel 61 comprises a hollow cylindrical wall 62 which may be counterbored and threaded as at 63, if desired, but the flexibility of charge in the modified form is derived mainly from the provision of an adjustable collar 64 encircling the barrel and being capable of vertical adjustment as by threaded engagement 66 with the barrel exterior. By suitable rotation of the collar 64 a plurality of overflow ports 67 are covered or uncovered to an extent necessary to produce a desired fluid level 68, any excess fluid in the barrel, as the filler is removed from the water ice solution reservoir, draining quickly outwardly through the ports and back into the reservoir prior to placement of the filler on the mold. The operator is thereby enabled to adjust the fluid charge 69 above the ball 70 covering the aperture 71 in a quick and positive fashion.

From a commercial aspect, one of the most important consequences of using the mold filler of my invention is the high resistance to breakage of the water ice confections produced thereby. Where the customary practice of freezing each flavor band solidly before adding the next flavor is followed, cleavage planes are formed at the interfaces of the flavors, permitting the product to fracture easily, as by a blow or jar, and to fall to the ground below, much to the annoyance of the consumer. Where, however, the next flavor solution is added prior to total freezing of the flavor below, the uppermost solution runs downwardly onto the subjacent partially frozen material and intermixes with the still partially fluid subjacent flavor in the central top region of the underlying flavor charge. The location of the pins 61 at the intersection of the longitudinal stringers 52 and the cross-cleats 58 enhances the likelihood of the new fluid, running out through the apertures 38, to drop directly downwardly into the partially frozen "pool" in the upper surface, center, of the subjacent charge, and thoroughly intermixing. Then, as subsequent at least partial freezing of the two bands takes place the upper and lower band are interlocked in a fashion comparable to a mortise and tenon or a doweled joint, the upper band having a depending projection extending downwardly into the subjacent flavor layer. Where it is objectionable that the customer see the downwardly projecting "ice dowel," it has been found that by making the lowermost charge from the darkest colored flavor, the "ice dowel" is not visible, i. e., it does not "shine through." The next, or middle layer in a three-tiered product, is made from the medium hued flavor and the uppermost charge from the lightest color. In each charge subsequent to the first charge, therefore, the fresh charge is added prior to total freezing of the previous charge. The center feed of the later charge resulting from the construction of my mold filler which tends to direct the subsequent charge directly downwardly into the cold but still liquid pool in the center surface of the lower charge (freezing taking place from the sides inwardly and bottom upwardly from the bounding metal mold) results in a product having an unusually great beam strength and one which is highly resistant to fracture.

It can therefore be seen that this frozen confection mold filler of my invention not only provides a readily adjustable dispenser of fluids but one which is economical, easily operated and free from the difficulties inherent in the large, complicated devices in the same field.

What is claimed is:

1. A fluid dispenser for use with a frozen confection mold having a horizontal panel and a depending mold form, said dispenser comprising a horizontal tray pierced by an opening in register with the mold form as said tray and the mold are moved into registering juxtaposition, a hollow barrel detachably mounted on the lower surface of said tray in coaxial alignment with said opening, the interior of said barrel forming a compartment of predetermined size, the bottom of said barrel having a vertical central aperture in communication with said compartment, the walls of said barrel being pierced by a horizontal passageway, a collar circumscribing said barrel adjacent said passageway and vertically adjustable to cover a predetermined fraction of the diameter of said passageway, a ball in said compartment adapted to seat against the margin of said aperture under urgency of gravity, and means for unseating said ball as said tray is moved into registering juxtaposition and into contact with the confection mold.

2. A frozen confection mold filler comprising a tray including a bottom and a pair of sides, said tray bottom having a plurality of rows of openings, a plurality of rows of filling barrels mounted on said tray below said openings, each of said barrels including a vertical chamber in registering communication with the corresponding one of said openings, each of said chambers being tapered at its lower end and terminating in a central aperture in the bottom of said barrel, a ball in each of said chambers adapted to cover the adjacent said apertures in seated position of said ball, a plurality of wire stringers each movably mounted on the ends of said tray and extending below a corresponding row of barrels, and a plurality of pins mounted vertically on said stringers and in register with said apertures in said barrels, said wire stringers and said pins being vertically movable from a first position wherein said pins are distant from the corresponding of said balls to a second position wherein said pins urge upwardly and unseat said balls from their aperture covering location.

3. A frozen confection mold filler for use with a mold having a horizontal panel with rows of hollow mold forms depending therefrom, said filler comprising a tray formed with a plurality of rows of openings in register with said rows of mold forms, a plurality of rows of hollow cylindrical barrels mounted on said tray and vertically disposed below said rows of openings, the bottom of each of said barrels being pierced by an aperture, a ball freely movable in each of said barrels and adapted to close said aperture in lowermost position of said ball, a mesh mounted on the upper surface of said tray, a plurality of rows of wires extending below said barrel apertures, a plurality of pins mounted on said wires below said barrel apertures, and means on the ends of said tray for mounting said wires for vertical motion of said pins between a first position wherein said pins are distant from said balls and a second position wherein said pins urge said balls upwardly from said lowermost position of said balls.

References Cited in the file of this patent

UNITED STATES PATENTS

| | | |
|---|---|---|
| 212,494 | Paddock | Feb. 18, 1879 |
| 383,979 | Perkins | June 5, 1888 |
| 594,667 | Wildi | Nov. 30, 1897 |
| 923,611 | Werd | June 1, 1909 |
| 1,958,795 | Lyle | May 15, 1934 |